(12) United States Patent
Lynch et al.

(10) Patent No.: US 10,908,254 B2
(45) Date of Patent: Feb. 2, 2021

(54) TRAVELING-WAVE IMAGING MANIFOLD FOR HIGH RESOLUTION RADAR SYSTEM

(71) Applicant: GM Global Technology Operations LLC, Detroit, MI (US)

(72) Inventors: Jonathan J. Lynch, Oxnard, CA (US); Keerti S. Kona, Woodland Hills, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 131 days.

(21) Appl. No.: 16/227,648

(22) Filed: Dec. 20, 2018

(65) Prior Publication Data
US 2020/0200866 A1 Jun. 25, 2020

(51) Int. Cl.
| | |
|---|---|
| *G01S 7/02* | (2006.01) |
| *H01Q 13/22* | (2006.01) |
| *G01S 13/89* | (2006.01) |
| *G01S 7/03* | (2006.01) |
| *H01Q 1/24* | (2006.01) |
| *G01S 7/41* | (2006.01) |
| *G01S 13/72* | (2006.01) |
| *G01S 13/06* | (2006.01) |

(52) U.S. Cl.
CPC ............ *G01S 7/025* (2013.01); *G01S 7/032* (2013.01); *G01S 7/41* (2013.01); *G01S 13/89* (2013.01); *H01Q 1/247* (2013.01); *G01S 13/06* (2013.01); *G01S 13/726* (2013.01)

(58) Field of Classification Search
CPC .. H01Q 21/005; H01Q 21/0043; H01Q 1/247; H01Q 13/10; H01Q 13/22; G01S 7/025; G01S 7/032; G01S 7/41; G01S 13/89
See application file for complete search history.

(56) References Cited

U.S. PATENT DOCUMENTS

| | | | |
|---|---|---|---|
| 9,287,614 B2 | 3/2016 | Vahidpour et al. | |
| 9,535,151 B2 | 1/2017 | Lynch | |
| 2015/0263429 A1* | 9/2015 | Vahidpour | H01Q 1/36 343/770 |
| 2017/0170540 A1* | 6/2017 | Morgan | H01P 5/087 |

OTHER PUBLICATIONS

Fromenteze et al., "Computational imaging using a mode-mixing cavity at microwave frequencies", Applied Physics Letters, 2015, pp. 1-7.
Hunt et al., "Metamaterial Apertures for Computational Imaging", Science, vol. 339, Jan. 18, 2013, pp. 310-313.
Jam et al., "A Dual-Polarized Micromachined Beam-Steering Radar at 240 GHz for Collision Avoidance Applications", 32nd URSI GASS, Aug. 2017, pp. 1-4.
Jam et al., "A Horizontally Polarized Beam-Steerable Antenna for Sub-millimeter-wave Polarimetric Imaging and Collision Avoidance Radars", IEEE, 2016, pp. 789-790.
Lynch, Jonathan "Low Latency Digital Beamforming Radar Using Aperture Coding", IEEE Transactions on Aerospace and Electronic Systems, vol. 52, No. 2, Apr. 2016, pp. 918-927.

* cited by examiner

Primary Examiner — Hoang V Nguyen
(74) Attorney, Agent, or Firm — Cantor Colburn LLP (57) ABSTRACT

A radar system includes a traveling-wave imaging manifold (TIM) antenna including a waveguide with multiple paths configured such that adjacent ones of the multiple paths have different path lengths. The radar system also includes a processor configured to generate a transmit signal to be input at an opening of the waveguide or to process a reflection obtained from the opening of the waveguide.

18 Claims, 7 Drawing Sheets

TRAVELING-WAVE IMAGING MANIFOLD FOR HIGH RESOLUTION RADAR SYSTEM

INTRODUCTION

The subject disclosure relates to a traveling-wave imaging manifold (TIM) for a high resolution radar system.

Radio detection and ranging (radar) systems are increasingly used to detect and track objects in a variety of applications. For example, on a vehicle (e.g., automobile, truck, construction equipment, farm equipment, automated factory equipment), a radar system may detect and track objects in order to facilitate augmentation or automation of vehicle operation. Range and angle resolution are important metrics in many radar applications, such as vehicle applications, to facilitate properly discerning the relative positions of objects. Accordingly, it is desirable to provide TIM for a high resolution radar system.

SUMMARY

In one exemplary embodiment, a radar system includes a traveling-wave imaging manifold (TIM) antenna including a waveguide with multiple paths such that adjacent ones of the multiple paths have different path lengths. The radar system also includes a processor to generate a transmit signal to be input at an opening of the waveguide or to process a reflection obtained from the opening of the waveguide.

In addition to one or more of the features described herein, the transmit signal is a frequency modulated signal.

In addition to one or more of the features described herein, the radar system also includes radiating slots arranged in a line and configured to cover the multiple paths, wherein the multiple paths have a pseudorandom distribution of path lengths.

In addition to one or more of the features described herein, the radar system also includes a plurality of the TIM antennas arranged orthogonally with respect to the line of the radiating slots.

In addition to one or more of the features described herein, the plurality of the TIM antennas are configured to have a same phase difference between adjacent ones of the plurality of TIM antennas.

In addition to one or more of the features described herein, the radar system also includes one or more additional radiating elements associated with each of the radiating slots and arranged orthogonally with respect to the line of the radiating slots. The additional radiating elements are aperture-coupled patch antennas, dielectric rod antennas, dipole antennas, horn antennas, spiral antennas, or leaky wave antennas.

In addition to one or more of the features described herein, the radar system also includes a second TIM antenna with second radiating slots arranged in the line. The radiating slots of the TIM antenna emit a pseudo-random radiation pattern based on the transmit signal, the second radiating slots of the second TIM antenna receive reflected energy resulted from the pseudo-random radiation pattern emitted by the TIM antenna, and the radiating slots arranged in the line are perpendicular to the second radiating slots arranged in the line.

In addition to one or more of the features described herein, the radiating slots are slanted 45 degrees with respect to an axis of the TIM antenna, and the second radiating slots are slanted 45 degrees with respect to the axis of the second TIM antenna.

In addition to one or more of the features described herein, the TIM antenna is one of a plurality of the TIM antennas arranged in a series.

In addition to one or more of the features described herein, each of the plurality of the TIM antennas is provided with a corresponding one of the transmit signals, and a phase shift of each of the transmit signals is controlled individually.

In another exemplary embodiment, a method of configuring a radar system includes fabricating a traveling-wave imaging manifold (TIM) antenna to include a waveguide with multiple paths configured such that adjacent ones of the multiple paths have different path lengths. The method also includes configuring a processor to generate a transmit signal to be input at an opening of the waveguide or to process a reflection obtained from the opening of the waveguide.

In addition to one or more of the features described herein, the configuring the processor includes the processor generating the transmit signal as a frequency modulated signal.

In addition to one or more of the features described herein, the fabricating the TIM antenna includes fabricating radiating slots arranged in a line as a cover for the multiple paths, wherein the multiple paths have a pseudorandom distribution of path lengths.

In addition to one or more of the features described herein, the method also includes fabricating a plurality of the TIM antennas arranged orthogonally with respect to the line of the radiating slots.

In addition to one or more of the features described herein, the fabricating the plurality of the TIM antennas includes configuring the plurality of the TIM antennas to have a same phase difference between adjacent ones of the plurality of TIM antennas.

In addition to one or more of the features described herein, the method also includes arranging one or more antennas additional radiating elements associated with each of the radiating slots to be orthogonal with respect to the line of the radiating slots. The additional radiating elements are aperture-coupled patch antennas, dielectric rod antennas, dipole antennas, horn antennas, spiral antennas, or leaky wave antennas.

In addition to one or more of the features described herein, the method also includes fabricating a second TIM antenna with second radiating slots arranged in the line. The radiating slots of the TIM antenna emit a pseudo-random radiation pattern based on the transmit signal, the second radiating slots of the second TIM antenna receive reflected energy resulted from the pseudo-random radiation pattern emitted by the TIM antenna, and the radiating slots arranged in the line are perpendicular to the second radiating slots arranged in the line.

In addition to one or more of the features described herein, the fabricating the TIM antenna and the fabricating the second TIM antenna includes the radiating slots being slanted 45 degrees with respect to an axis of the TIM antenna and the second radiating slots being slanted 45 degrees with respect to the axis of the second TIM antenna.

In addition to one or more of the features described herein, the method also includes fabricating a plurality of the TIM antennas in a series.

In addition to one or more of the features described herein, the configuring the processor includes having the processor provide each of the plurality of the TIM antennas with a corresponding one of the transmit signals, a phase shift of each of the transmit signals being controlled individually.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

As previously noted, radar systems facilitate augmented or automated vehicle operation. Exemplary vehicle systems that benefit from the detection and tracking afforded by radar systems include autonomous driving systems, collision avoidance systems, adaptive cruise control systems, and automatic braking systems. Generally, a wide field of view (FOV) covering the entire 360 degrees in azimuth as well as 45 degrees in elevation is desirable for a vehicle-based radar system. A prior approach involves using a narrow high gain beam (e.g., a pencil beam) and sequentially scanning the FOV. However, this approach may be time-consuming, because it requires a large number of acquisitions.

For example, in a conventional phased array radar, directionality of the radar beam to achieve the sequential scanning may be controlled using a phase shifter associated with each transmit antenna element. An exemplary 1 degree beam covering a 100 degree by 45 degree FOV would require 4500 beams or 4500 acquisitions to cover the FOV. The transmit signal may be a frequency sweep such as, for example, a linear frequency modulated continuous wave (LFMCW) signal (i.e., a chirp). In a multi-input multi-output (MIMO) radar system with multiple transmit elements, each of the phase shifters may be set (e.g., to 0 degrees or to 180 degrees) using a temporal pseudorandom code such that the far-field radiation pattern is a pseudorandom pattern that changes over the frequency range of the chirp. High gain beams, such as pencil beams, may be formed following reception of the signals by demodulating the (known) transmit element codes and forming linear combinations of the transmit element signals. However, multiple transmit elements, each with an associated phase shifter, represent a significant hardware cost in the radar system.

Embodiments of the systems and methods detailed herein involve a TIM antenna for a high resolution radar system. In a TIM antenna, a waveguide in the form of a manifold routes the transmit signal via meandering feed lines. The same type of TIM antenna can be used to receive reflected energy from objects in the vicinity of the radar that results from the transmissions. By varying the length of the waveguide sections across the manifold (i.e., having a pseudorandom distribution of path lengths), a pseudorandom pattern is created for the far-field radiation pattern as a chirp is radiated from, or collected by, the manifold. The digital beamforming according to embodiments detailed herein increases angular resolution, as well, but unlike the phase shifters associated with each transmit element in a conventional or MIMO array, the hardware cost is significantly lower. Additionally, acquisition time is relatively lower than for a conventional phased array, for example. This reduction in acquisition time is facilitated by the pseudorandom distribution of path lengths in the waveguide. That is, if the path lengths were all the same, then a high gain beam (e.g., a push broom beam) would be produced but this beam would have to be swept over the FOV, thereby requiring a number of acquisitions. However, the TIM antenna according to embodiments detailed herein requires only a single acquisition to cover the FOV.

Figure 1:
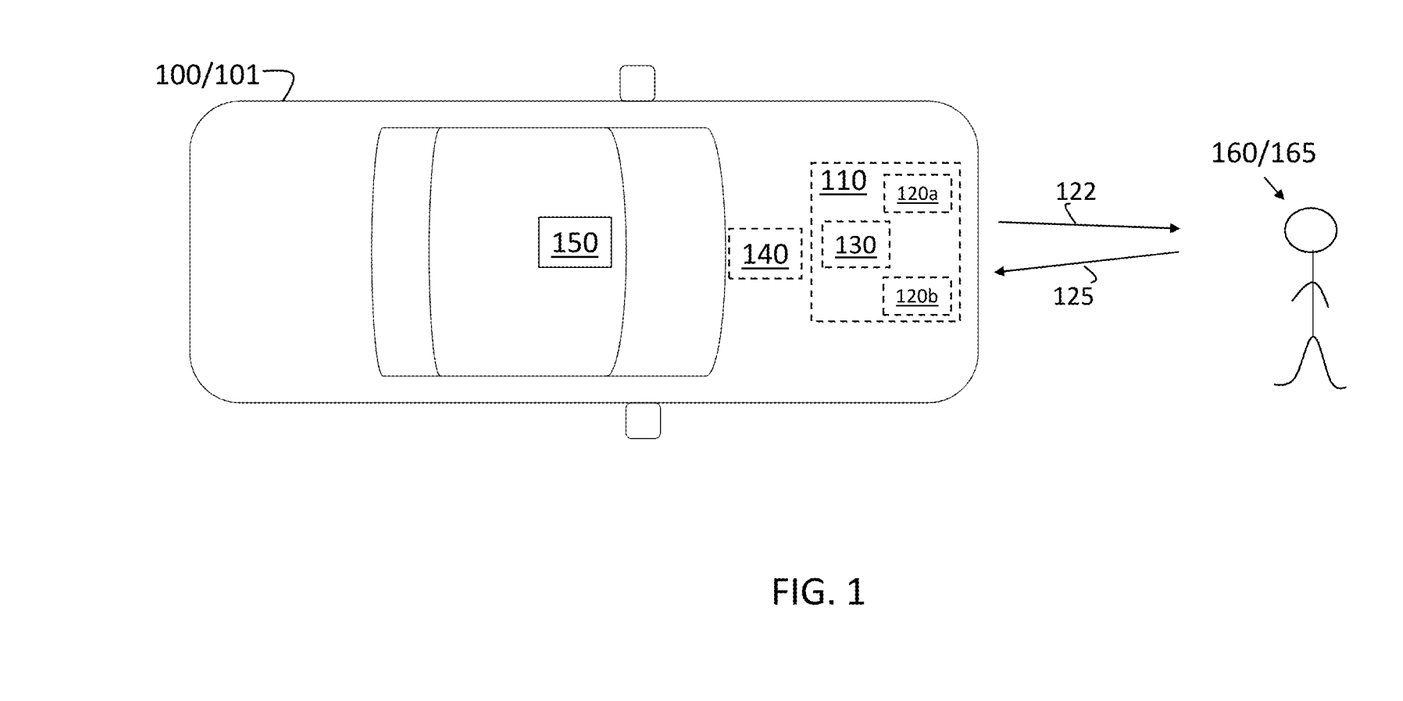
FIG. 1 is a block diagram of a vehicle that includes a traveling-wave imaging manifold (TIM) antenna for a high resolution radar system according to one or more embodiments.

In accordance with an exemplary embodiment, FIG. 1 is a block diagram of a vehicle 100 that includes a pair of TIM antennas 120a, 120b (generally referred to as 120) for a high resolution radar system 110. While separate TIM antennas 120a, 120b are shown for transmit and receive, the radar system 110 may include a single TIM antenna 120 for both transmit and receive according to alternate embodiments. The vehicle 100 shown in FIG. 1 is an automobile 101. The radar system 110 also includes a controller 130. The vehicle includes one or more vehicle controllers 140 (e.g., electronic control units (ECUs)) that perform autonomous driving or control various aspects of the operation of the vehicle 100 (e.g., braking, steering). The vehicle 100 may also include additional sensors 150 (e.g., light detection and ranging (lidar) system, camera). While exemplary locations are indicated in FIG. 1 for the radar system 110, vehicle controllers 140, and other sensors 150, those components can be located elsewhere in or on the vehicle 100 according to alternate embodiments.

Figure 2A:
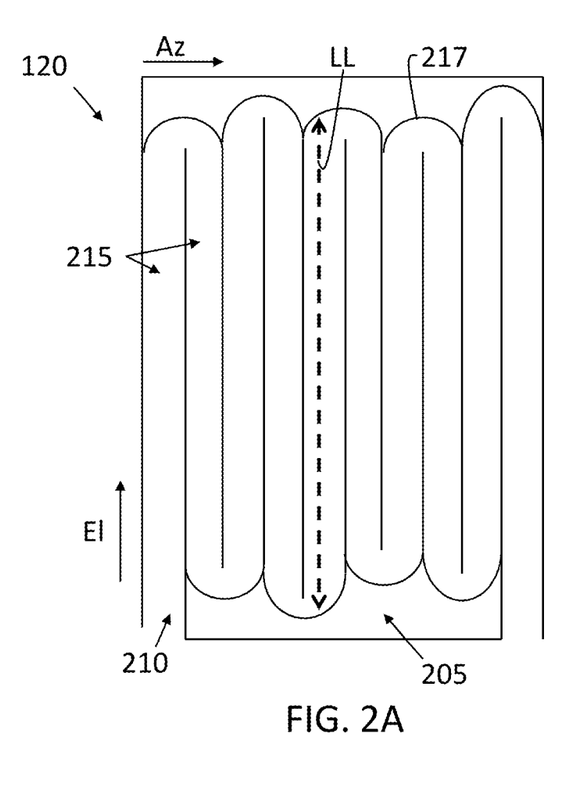
FIG. 2A is a cross-sectional view of an exemplary TIM antenna according to one or more embodiments.
Figure 2B:
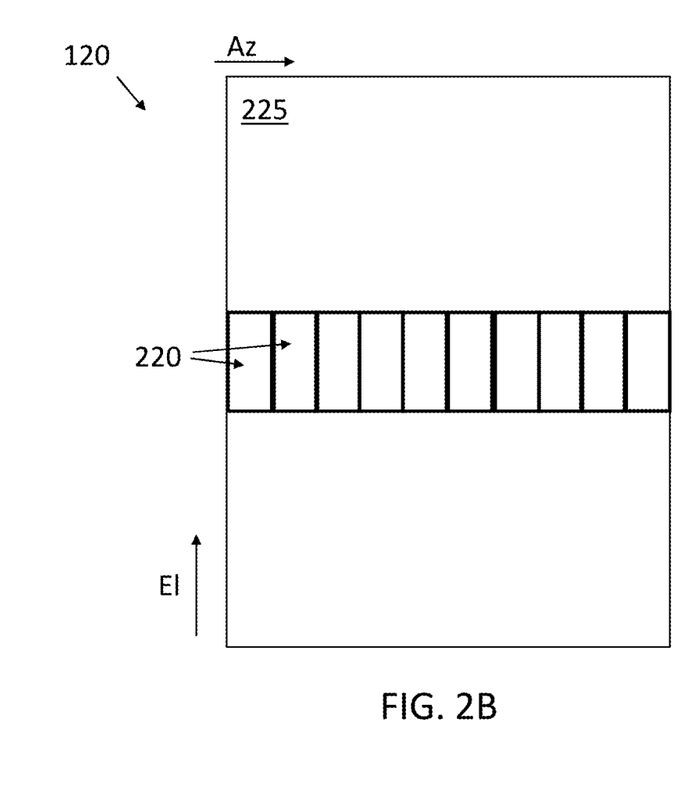
FIG. 2B shows the cover of an exemplary TIM antenna according to one or more embodiments.

The controller 130 of the radar system 110, alone or in conjunction with the vehicle controller 140, may generate chirps to generate transmitted signals 122 and process received reflections 125. Thus, the controller 130 or the vehicle controller 140 may include an oscillator and other components to generate the chirps. The controller 130 of the radar system 110 and the vehicle controller 140 may also include processing circuitry. The processing circuitry of the radar system 110 and the vehicle controller 140 may include an application specific integrated circuit (ASIC), an electronic circuit, a processor (shared, dedicated, or group) and memory that executes one or more software or firmware programs, a combinational logic circuit, and/or other suitable components that provide the described functionality. The radar system 110 may be used to detect objects 160 in its FOV such as the pedestrian 165 shown in FIG. 1. Information provided by the radar system 110 can include range, range-rate, azimuth, and elevation to the object 160. Aspects of the radar system 110 are further detailed with reference to FIG. 2.

FIGS. 2A and 2B show different views of an exemplary TIM antenna 120 for use in the radar system 110 shown in FIG. 1. FIG. 2A is a cross-sectional view of the TIM antenna 120. An exemplary orientation of the TIM antenna 120 is shown with azimuth (Az) and elevation (El) indicated. An exemplary size of the TIM antenna 120 that operates in the 76-81 GHz band may be on the order of 2.4 inches on the El side and 0.6 inches on the Az side. The cross-sectional view in FIG. 2A shows that the waveguide is comprised of a manifold or a number of meandering lines 215. FIG. 2B shows the cover 225 of the TIM antenna 120. The cover 225 includes openings or slots 220 that facilitate emission of the transmission energy. Each slot 220 may be sized and arranged to correspond with a line 215 of the manifold, according to an exemplary embodiments, and the width of each slot 220 may be stepped or include other physical features within the slot 220 to control the amount of energy radiated from each slot 220.

As further discussed, variations in the distance traversed by each line 215 (i.e., the line length LL) of the waveguide 217, results in a pseudo-random radiation pattern. This pseudo-random radiation pattern is similar to one that would result from different settings for phase shifters associated with each transmit element but is accomplished with a passive antenna. Sweeping the frequency through the operating frequency band creates pseudorandom transmit patterns, similar to what results from changing the states of phase shifters over the course of a frequency sweep in a MIMO radar. Because of antenna reciprocity, the technique may also be used as a receiving antenna. According to alternate embodiments, the pseudo-random radiation pattern may be obtained by varying the width of the waveguide (i.e., the width of each line 215) or by inserting dielectric or magnetic materials to vary the effective (electrical) path length.

The chirp can be input to the TIM antenna 120 and, additionally or alternatively, a reflected signal can be obtained from the TIM antenna 120 at the waveguide 217 opening 210. That is, the TIM antenna 120 can be a transmit antenna, a receive antenna, or both in a transceiver configuration. As FIG. 2A indicates, as a signal traverses the waveguide, which is in the form of a manifold, the length traversed in each line 215 (i.e., each line length LL) may be different, and each line 215 represents an antenna element. The difference in LL may be created by conducting material 205 that defines the ends of the manifold. As previously noted, an effective difference in LL may instead be created by inserting dielectric or magnetic materials of specific lengths inside the waveguide to vary the lengths from section to section and to create electrical length differences between sections. The pseudo-random variations in line length LL result in pseudo-random antenna patterns (i.e., in the far-field radiation pattern) due to the pseudorandom differences in phase shift between antenna elements. The difference (ΔL) between line lengths LL needed to effectively spoil the beam (i.e., make the beam non-directive) may be determined as:

$$\Delta L = \frac{2\pi}{\beta_0} \quad [\text{EQ. 1}]$$

In EQ. 1, $\beta_0$ is the propagation constant in the waveguide at the center frequency of the chirp that is input at the opening 210. For example, the frequency band of operation for the radar system 110 may be 77 gigahertz (GHz) to 81 GHz, which is generally used in vehicle applications. Thus, the center frequency may be 79 GHz. The average line length LL ($L_{avg}$) necessary to provide high resolution digitally formed beams over a wide field of view is given by:

$$L_{avg} = \frac{2\pi}{\Delta \beta} \quad [\text{EQ. 2}]$$

In EQ. 2, $\Delta \beta$ is the change in propagation constant over the operating frequency range. For the exemplary operating frequency range of 77 GHz to 81 GHz and a waveguide 217 width of 3 millimeters (mm), $\Delta \beta$ is 0.108 rad/mm so Lavg=58 mm.

Figure 3:
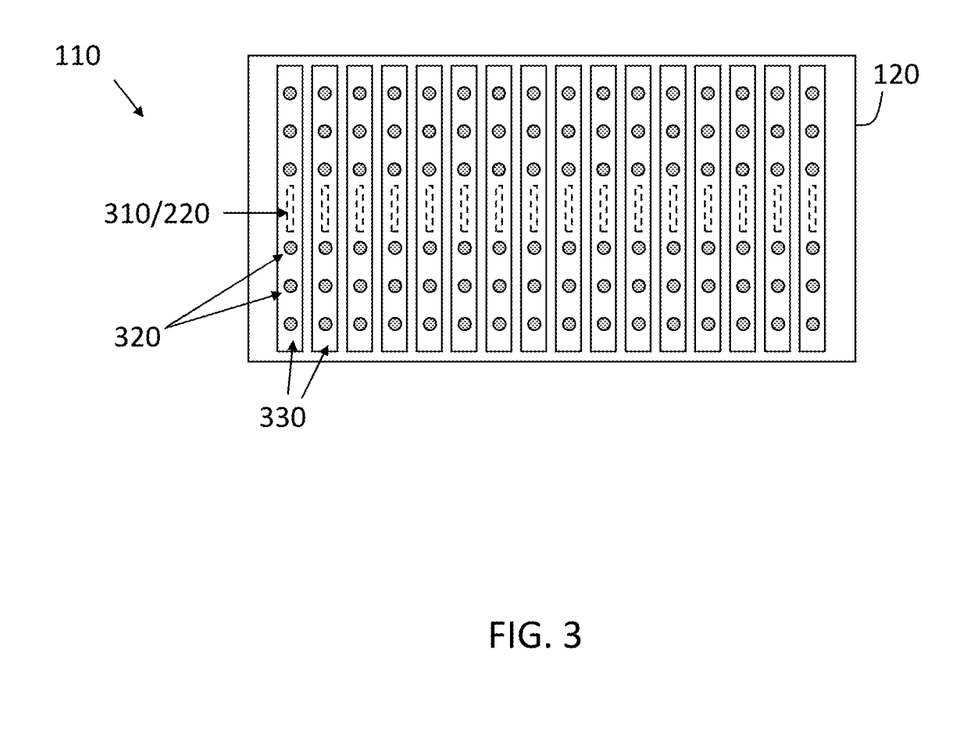
FIG. 3 shows aspects of the radar system for an exemplary embodiment of the TIM antenna involving a reduction in field of view.

FIG. 3 shows aspects of the radar system 110 for an exemplary embodiment of the TIM antenna 120 involving a reduction in the FOV. A row of TIM apertures 310 is shown. The waveguide 217 with a pseudorandom distribution of line lengths LL is behind the TIM apertures 310 according to the view shown in FIG. 3. Exemplary apertures are the radiating slots 220 discussed with reference to FIG. 2. Additional radiating elements 320 are also shown in FIG. 3. Feed lines 330 for these additional radiating elements 320 are shown. In the exemplary embodiment shown in FIG. 3, the additional radiating elements 320 are arranged to be equidistant from each other along a feed line 330. Exemplary additional radiating elements 320 include aperture-coupled patch antennas, dielectric rod antennas, dipole antennas, horn antennas, spiral antennas, and leaky wave antennas. As shown, these additional radiating elements 320 are arranged orthogonally with respect to the array of TIM apertures 310 shown for the exemplary TIM antenna 120. The radiating elements 320 arranged as shown in the exemplary orientation (i.e., along the elevation axis) reduce the vertical FOV of the radar system 110. That is, the relative phases of the individual radiating elements 310 are fixed, reducing the FOV in the axis (e.g., elevation, in the example) that is perpendicular to the axis (e.g., azimuth, in the example) along which the array of TIM apertures 310 is arranged.

Figure 4:
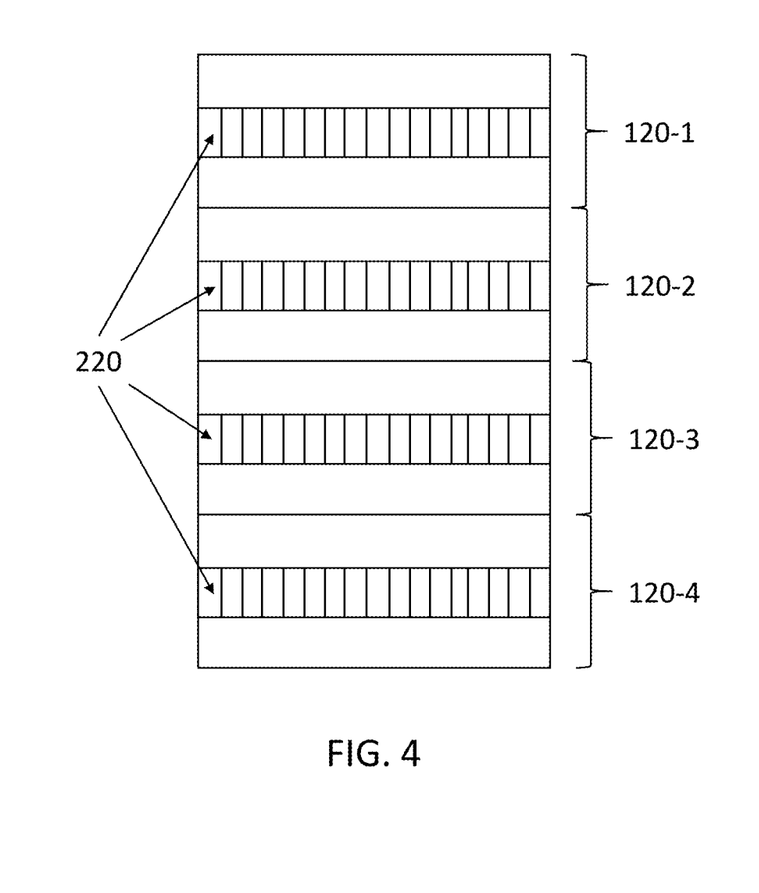
FIG. 4 shows aspects of the radar system for an exemplary embodiment with multiple TIM antennas to increase the field of view.

FIG. 4 shows aspects of the radar system 110 for an exemplary embodiment including multiple TIM antennas 120 in an array. Four TIM antennas 120-1, 120-2, 120-3, 120-4 (generally referred to as 120) are shown in the exemplary embodiment of FIG. 4. The TIM antennas 120 are arranged orthogonally with respect to the row of radiating slots 220 shown for each of the TIM antennas 120. Each of the TIM antennas 120 may be operated independently or they may be operated together, and either in transmit or receive mode. That is when the TIM antennas 120 are used for transmission, each TIM antenna 120 has a chirp input at the corresponding opening 210, shown in FIG. 2, of the TIM antenna 120. The frequencies swept by the chirp input to each TIM antenna 120 may be different, which is a form of MIMO. In this way, digital beam forming may be accomplished in the azimuth direction. Alternately, the amplitude and frequency range of the chirp input to each TIM antenna 120 may be the same but the phase may be different, possibly with pseudorandom phase codes for MIMO or with equal phase differences between TIM arrays to form physical beams. For example, the phase difference between the chirps input to TIM antennas 120-4 and 120-3 may be the same as the phase difference between the chirps input to TIM antennas 120-3 and 120-2 as well as to TIM antennas 120-2 and 120-1. In this way, beam steering may be accomplished in the elevation direction. When the TIM antennas 120 are used for reception, each TIM antenna 120 has a separate downconverter and other hardware coupled to the opening 210 and beams are formed digitally following reception.

Figure 5:
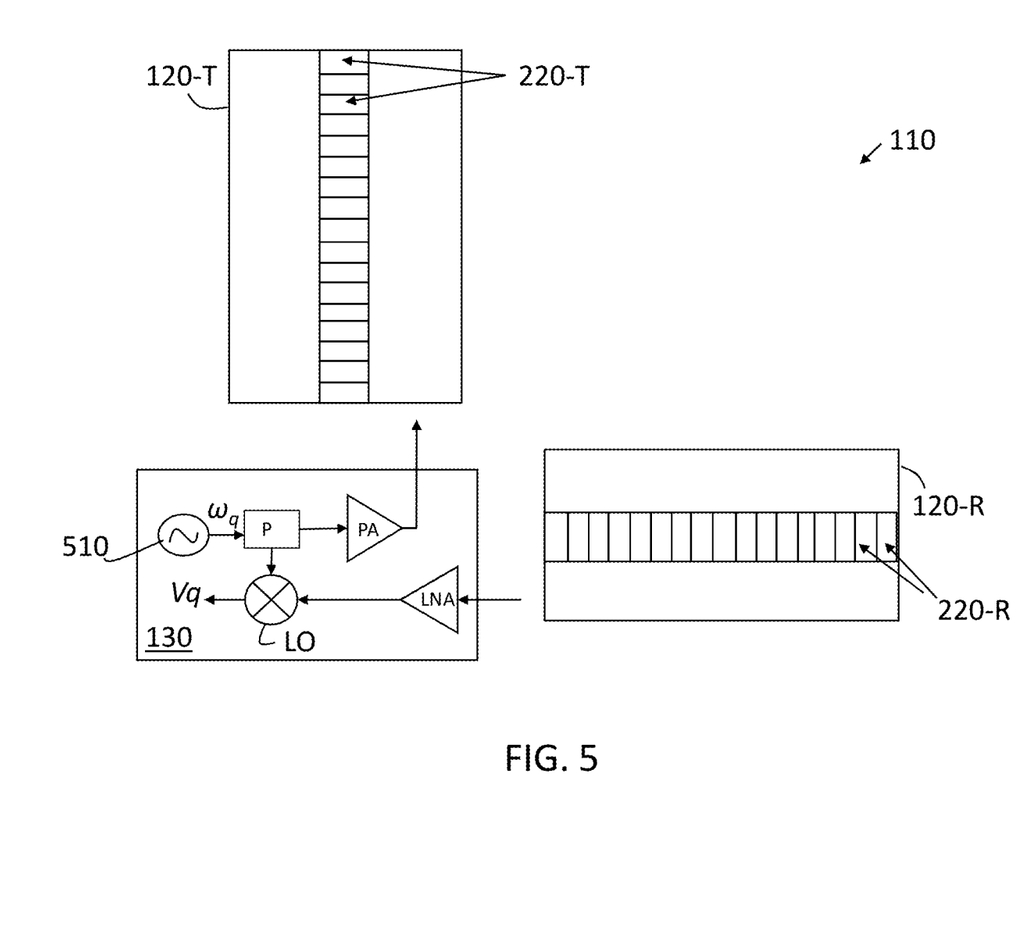
FIG. 5 shows aspects of a radar system with different transmit and receive TIM antennas according to an exemplary embodiment.
Figure 6:
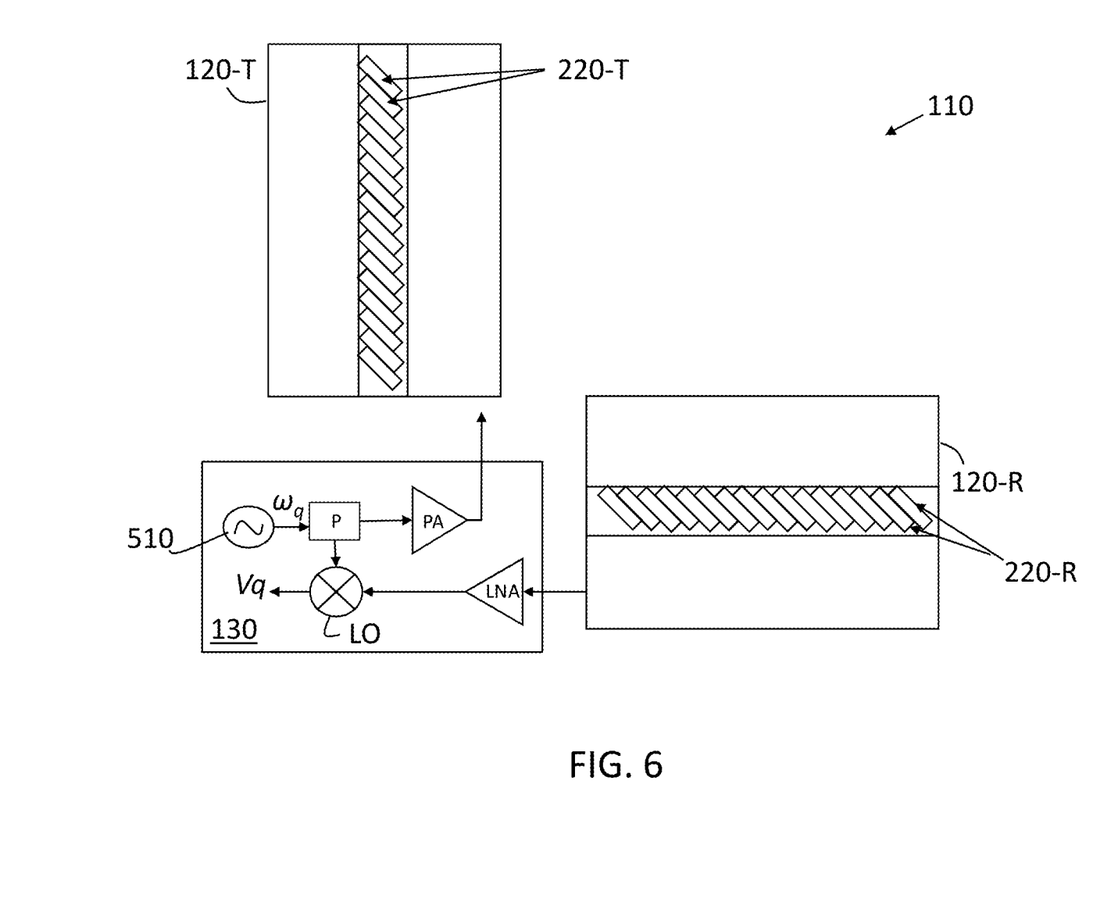
FIG. 6 shows aspects of a radar system with different transmit and receive TIM antennas according to another exemplary embodiment.

FIGS. 5 and 6 show radar systems 110 with different transmit and receive TIM antennas 120 according to exemplary embodiments. TIM antennas 120 that use radiating slots 220 produce or receive radiation that is polarized in a specific direction relative to the slot 220. If two such TIM antennas 120 are used with the transmit TIM antenna 120 and receive TIM antenna 120 axes orthogonal to one another, then the transmit TIM antenna 120 and the receive TIM antenna 120 will be cross-polarized, as shown in FIG. 5. This may be desirable in some radar systems 110 because complex objects (e.g., vehicles, pedestrians) tend to reflect significant energy whose polarization is orthogonal to the transmitted polarization. In other radar systems 110, to mitigate reduction in the total amount of reflected power that is collected by the receiving TIM antenna 120, modifications may be made. In one exemplary case, radiating TIM elements that are circularly polarized may be used. In another exemplary case, the polarization of one of the two sets of TIM antennas 120 may be rotated to rotate the polarization by 90 degrees. One way to accomplish this may be by physically twisting the slots by 90 degrees between the waveguide 217 and the output aperture. Another way may be to use a polarization rotator over the antenna 120. A third way may be to use radiating slots that are slanted 45 degrees with respect to the axis of the TIM antenna 120, as shown in FIG. 6.

FIG. 5 is a radar system 110 with different transmit and receive TIM antennas 120 according to an exemplary embodiment. The transmit TIM antenna 120-T and the receive TIM antenna 120-R (generally referred to as 120) are shown with corresponding radiating slots 220-T and 220-R (generally referred to as 220). The controller 130 supplies a chirp to the transmit TIM antenna 120-T and processes a reflection obtained from the receive TIM antenna 120-R. Aspects of the controller 130 are detailed in FIG. 5. As shown, an oscillator 510 generates a radian frequency sweep $\omega_q$ with q representing a discrete time index. A power splitter (P) taps off power for the mixer local oscillator (LO) and delivers the rest to a power amplifier (PA) to deliver a high power chirp to the transmit TIM antenna 120-T. When a reflection is received by the receive TIM antenna 120-R, a low noise amplifier (LNA) is used to boost the reflected signal power prior to mixing the result with the LO. The result is a mixer output voltage Vq that may be further processed (e.g., provided to an analog-to-digital converter (ADC) and digitally processed). Range, range-rate, and bearing may be estimated using a matched filter processing or other known technique with a lower acquisition time based on the exemplary orientations of the TIM antennas 120.

As FIG. 5 indicates, the array of radiating slots 220-T of the transmit TIM antenna 120-T are perpendicular (i.e., orthogonal) to the array of radiating slots 220-R of the receive TIM antenna 120-R. Thus, TIM antennas 120-T and 120-R are cross-polarized. According to the orientation of the array of radiating slots 220-T, 220-R, the transmit TIM antenna 120-T emits a pseudo-random pattern in elevation according to the exemplary embodiment, while the receive TIM antenna 120-R has a pseudo-random radiation pattern in azimuth. This allows the transmit TIM antenna 120-T to produce effective beams with low directivity (i.e., width) in the azimuth plane but high directivity in the elevation plane following digital processing, and the receive TIM antenna 120-R to produce effective beams with low directivity in the elevation plane but high directivity in the azimuth plane following digital processing. Such beams are often referred to as "push-broom" beams, because they are broad in one dimension and narrow in the other. The combination of the transmit TIM antenna 120-T and receive TIM antenna 120-R, as shown, creates a detection pattern that is the product of the two orthogonally oriented push-broom beams, producing a pencil beam with high resolution in both azimuth and elevation. A large reflection signal is received from any object 160 located at the intersection of the two effective beams but not much reflection signal is received from objects 160 outside the intersection. Accordingly, a low latency three-dimensional radar image is produced with the exemplary configuration shown in FIG. 5.

FIG. 6 is a radar system 110 with different transmit and receive TIM antennas 120 according to another exemplary embodiment. As FIG. 6 indicates, the array axis of radiating slots 220-T of the transmit TIM antenna 120-T are perpendicular (i.e., orthogonal) to the array axis of radiating slots 220-R of the receive TIM antenna 120-R. Unlike the radiating slots 220-T, 220-R shown in FIG. 5, both arrays of radiating slots 220-T, 220-R are slanted 45 degrees with respect to the respective axes of the TIM antennas 120-T, 120-R. As a result, the transmit radiating slots 220-T and the receive radiating slots 220-R have the same orientation and are, therefore, co-polarized. This arrangement avoids the reduction in the total amount of reflected power that is collected by the receiving TIM antenna 120-R in FIG. 5 (because the radiating slots 220-T, 220-R in FIG. 5 are cross-polarized).

Figure 7:
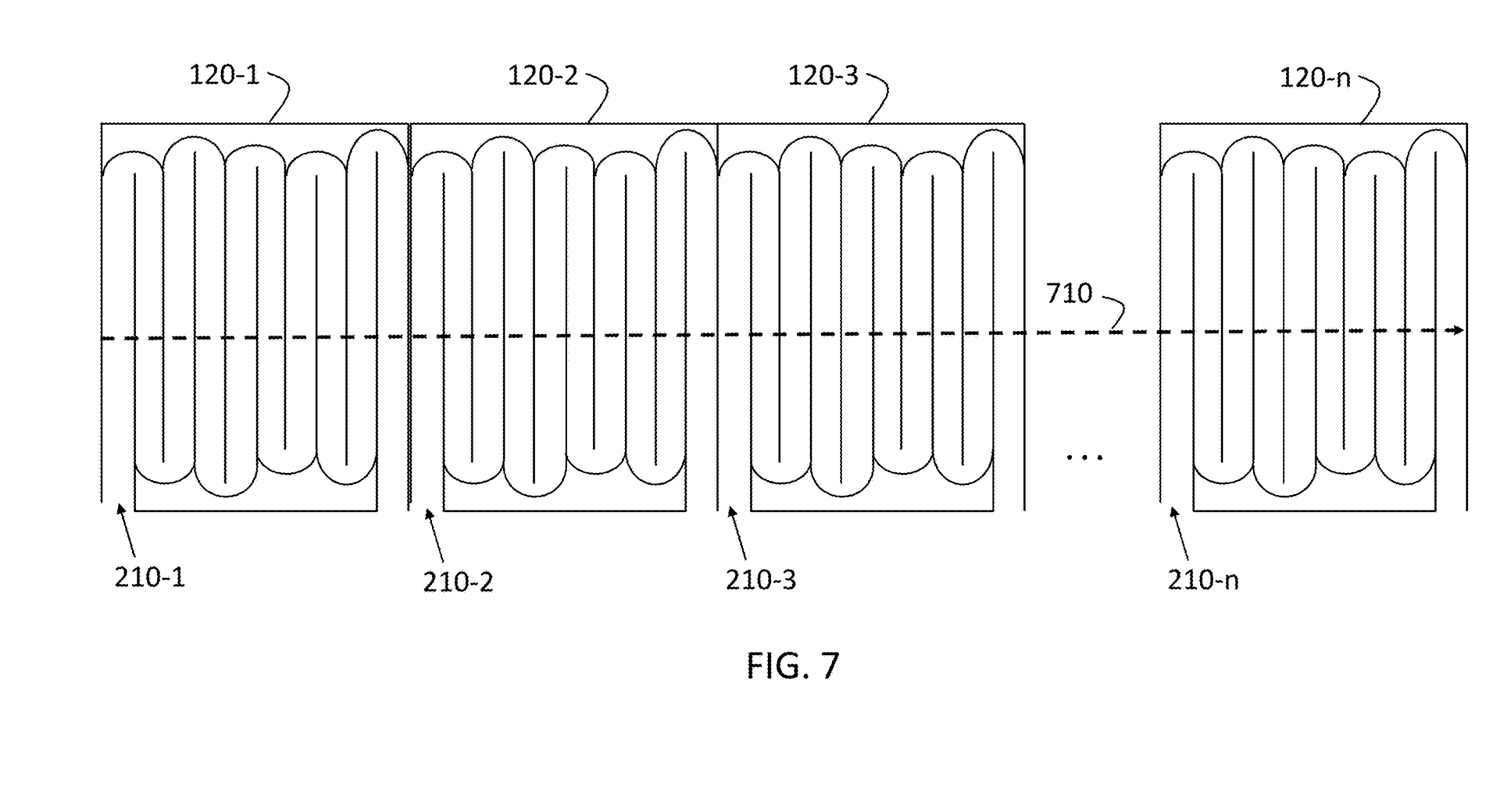
FIG. 7 shows an exemplary embodiment of an array of TIM antennas.

FIG. 7 shows an exemplary embodiment of an array of TIM antennas 120 according to one or more embodiments. The array of TIM antennas 120 increases the gain in the plane (indicated by the dashed line 710 in FIG. 7) along which the radiating slots 220 may be arranged. As FIG. 7 indicates, TIM antennas 120-1 through 120-n (referred to generally as 120) are arranged in an array such that each TIM antenna 120 is a sub-array. The dissipative losses of each of the TIM antennas 120 is lower and the signal-to-noise ratio (SNR) is increased by a factor equal to the number of channels (TIM antennas 120) used in the array. The arrangement of FIG. 6 may be a variation on the arrangement discussed with reference to FIG. 4. As such, the chirp input to each opening 210-1 through 210-n (generally referred to as 210), may be phase coded, as discussed with reference to FIG. 4, for MIMO processing.

That is, the amplitude and frequency sweep of each chirp input to each opening 210 may be the same, but the phase may differ in a repeating pattern. For example, with four TIM antennas 120 in the array, the phase of each may be 0 degrees, 180 degrees, 0 degrees, and 180 degrees or 0 degrees, 0 degrees, 180 degrees, 180 degrees, and this code may be temporally varied over the chirp or from chirp to chirp. The sub-arrays may instead be modulated using orthogonal waveforms or a time division multiplexing scheme. For example, a MIMO architecture may be implemented by transmitting from each TIM antenna 120 in turn. This may improve beamforming performance of the radar system 110. For a receive antenna array, output from each of the TIM antennas 120 would be separately down-converted and digitized for subsequent digital processing.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A radar system, comprising:
a traveling-wave imaging manifold (TIM) antenna including a waveguide with multiple paths configured such that adjacent ones of the multiple paths have different path lengths;
a processor configured to generate a transmit signal to be input at an opening of the waveguide or to process a reflection obtained from the opening of the waveguide; and
radiating slots arranged in a line and configured to cover the multiple paths, wherein the multiple paths have a pseudorandom distribution of path lengths.

2. The radar system according to claim 1, wherein the transmit signal is a frequency modulated signal.

3. The radar system according to claim 1, further comprising a plurality of the TIM antennas arranged orthogonally with respect to the line of the radiating slots.

4. The radar system according to claim 3, wherein the plurality of the TIM antennas are configured to have a same phase difference between adjacent ones of the plurality of TIM antennas.

5. The radar system according to claim 1, further comprising one or more additional radiating elements associated with each of the radiating slots and arranged orthogonally with respect to the line of the radiating slots, wherein the additional radiating elements are aperture-coupled patch antennas, dielectric rod antennas, dipole antennas, horn antennas, spiral antennas, or leaky wave antennas.

6. The radar system according to claim 1, further comprising a second TIM antenna with second radiating slots arranged in the line, wherein the radiating slots of the TIM antenna emit a pseudo-random radiation pattern based on the transmit signal, the second radiating slots of the second TIM antenna receive reflected energy resulted from the pseudo-random radiation pattern emitted by the TIM antenna, and the radiating slots arranged in the line are perpendicular to the second radiating slots arranged in the line.

7. The radar system according to claim 6, wherein the radiating slots are slanted 45 degrees with respect to an axis of the TIM antenna, and the second radiating slots are slanted 45 degrees with respect to the axis of the second TIM antenna.

8. The radar system according to claim 1, wherein the TIM antenna is one of a plurality of the TIM antennas arranged in a series.

9. The radar system according to claim 8, wherein each of the plurality of the TIM antennas is provided with a corresponding one of the transmit signals, and a phase shift of each of the transmit signals is controlled individually.

10. A method of configuring a radar system, the method comprising:
fabricating a traveling-wave imaging manifold (TIM) antenna to include a waveguide with multiple paths configured such that adjacent ones of the multiple paths have different path lengths; and
configuring a processor to generate a transmit signal to be input at an opening of the waveguide or to process a reflection obtained from the opening of the waveguide, wherein the fabricating the TIM antenna includes fabricating radiating slots arranged in a line as a cover for the multiple paths, and the multiple paths have a pseudorandom distribution of path lengths.

11. The method according to claim 10, wherein the configuring the processor includes the processor being configured to generate the transmit signal as a frequency modulated signal.

12. The method according to claim 10, further comprising fabricating a plurality of the TIM antennas arranged orthogonally with respect to the line of the radiating slots.

13. The method according to claim 12, wherein the fabricating the plurality of the TIM antennas includes configuring the plurality of the TIM antennas to have a same phase difference between adjacent ones of the plurality of TIM antennas.

14. The method according to claim 10, further comprising arranging one or more antennas additional radiating elements associated with each of the radiating slots to be orthogonal with respect to the line of the radiating slots, wherein the additional radiating elements are aperture-coupled patch antennas, dielectric rod antennas, dipole antennas, horn antennas, spiral antennas, or leaky wave antennas.

15. The method according to claim 10, further comprising fabricating a second TIM antenna with second radiating slots arranged in the line, wherein the radiating slots of the TIM antenna emit a pseudo-random radiation pattern based on the transmit signal, the second radiating slots of the second TIM antenna receive reflected energy resulted from the pseudo-random radiation pattern emitted by the TIM antenna, and the radiating slots arranged in the line are perpendicular to the second radiating slots arranged in the line.

16. The method according to claim 15, wherein the fabricating the TIM antenna and the fabricating the second TIM antenna includes the radiating slots being slanted 45 degrees with respect to an axis of the TIM antenna and the second radiating slots being slanted 45 degrees with respect to the axis of the second TIM antenna.

17. The method according to claim 10, further comprising fabricating a plurality of the TIM antennas in a series.

18. The method according to claim 17, wherein the configuring the processor includes having the processor provide each of the plurality of the TIM antennas with a corresponding one of the transmit signals, a phase shift of each of the transmit signals being controlled individually.

* * * * *